(12) United States Patent
Belpaire et al.

(10) Patent No.: US 10,906,595 B2
(45) Date of Patent: Feb. 2, 2021

(54) DEVICE FOR REINFORCING A STRUCTURAL ELEMENT

(71) Applicant: SIKA TECHNOLOGY AG, Baar (CH)

(72) Inventors: Vincent Belpaire, Uccle (BE); Ardi Shehu, Rotselaar (BE)

(73) Assignee: SIKA TECHNOLOGY AG, Baar (CH)

( * ) Notice: Subject to any disclaimer, the term of this patent is extended or adjusted under 35 U.S.C. 154(b) by 163 days.

(21) Appl. No.: 16/192,380

(22) Filed: Nov. 15, 2018

(65) Prior Publication Data
US 2019/0144050 A1    May 16, 2019

(30) Foreign Application Priority Data
Nov. 15, 2017    (EP) .................................. 17201955

(51) Int. Cl.
*B62D 29/00* (2006.01)
*B62D 25/04* (2006.01)
*B62D 25/00* (2006.01)

(52) U.S. Cl.
CPC ........... *B62D 29/002* (2013.01); *B62D 25/00* (2013.01); *B62D 25/04* (2013.01); *B62D 29/005* (2013.01)

(58) Field of Classification Search
CPC ...... B62D 29/002; B62D 25/00; B62D 25/04; B62D 29/005
USPC ........................................ 296/187.02, 29, 30
See application file for complete search history.

(56) References Cited

U.S. PATENT DOCUMENTS

| 6,341,467 B1* | 1/2002 | Wycech | B29C 44/18 296/193.06 |
| 2003/0042056 A1* | 3/2003 | Schneider | B62D 29/002 180/68.5 |
| 2004/0255546 A1* | 12/2004 | Sophiea | B62D 29/002 52/745.19 |
| 2008/0296164 A1* | 12/2008 | Dajek | B62D 29/004 205/80 |

(Continued)

FOREIGN PATENT DOCUMENTS

| EP | 2 289 771 A1 | 3/2011 |
| WO | 01/83206 A1 | 11/2001 |
| WO | 03/020574 A1 | 3/2003 |

OTHER PUBLICATIONS

May 25, 2018 extended European Search Report issued in European Patent Application No. 17201955.6.

(Continued)

*Primary Examiner* — Jason S Morrow
*Assistant Examiner* — E Turner Hicks
(74) *Attorney, Agent, or Firm* — Oliff PLC

(57) ABSTRACT

A device for reinforcing a structural element in a motor vehicle including: a reinforcing element which has a longitudinal axis and which is disposable in a cavity of the structural element, wherein the reinforcing element includes side walls which extend substantially in the direction of the longitudinal axis, wherein a fastening element for the preliminary fixing of the reinforcing element to the structural element is disposed on a first side wall, wherein a side wall that is opposite the first side wall at a location that is opposite the fastening element has a closed surface for connecting to the structural element.

16 Claims, 4 Drawing Sheets

(56) References Cited

U.S. PATENT DOCUMENTS

2016/0194036 A1* 7/2016 Kurokawa ............. B62D 25/04
296/203.01
2016/0229457 A1* 8/2016 Boettcher ............ B62D 29/005
2018/0015957 A1* 1/2018 Kishima ............. B62D 29/002

OTHER PUBLICATIONS

Mar. 13, 2020 Office Action issued in European Patent Application No. 17201955.6.

* cited by examiner

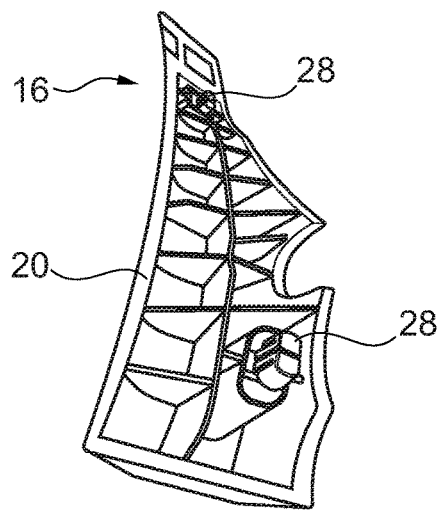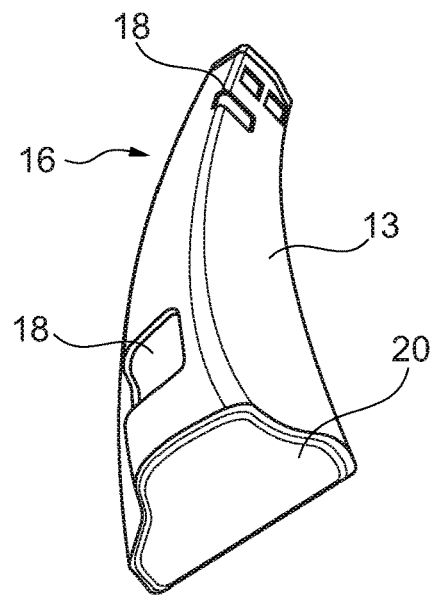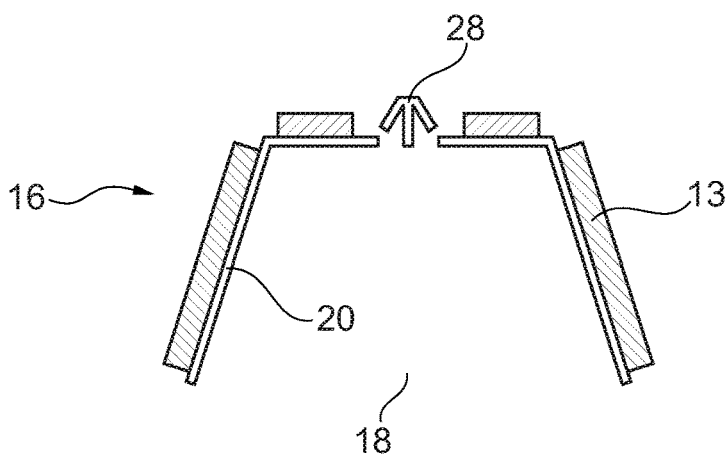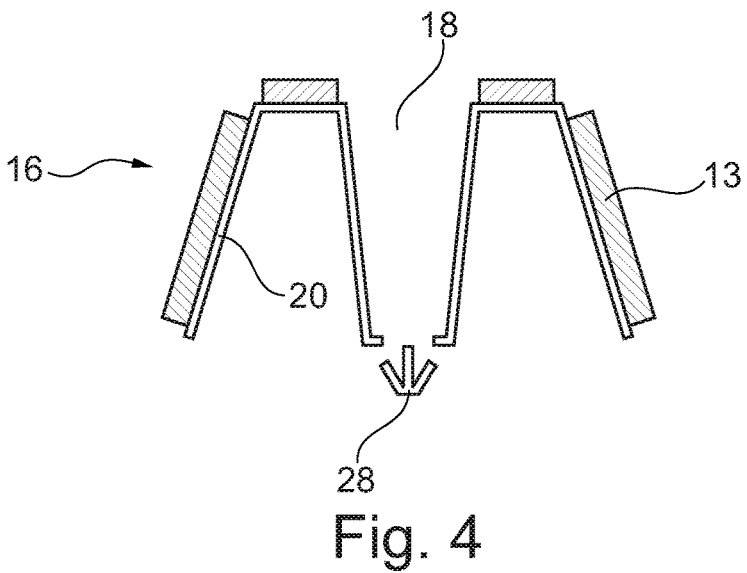

DEVICE FOR REINFORCING A STRUCTURAL ELEMENT

The present invention relates to a device for reinforcing a structural element in a motor vehicle, as well as to a system of a reinforced structural element in a motor vehicle.

Construction elements such as, for example, bodies and/or chassis frames of transportation and conveyance means, in particular of aquatic or terrestrial vehicles or of aircraft, in many instances have structures having cavities in order for lightweight constructions to be enabled. These cavities however cause the most varied of problems. Depending on the type of the cavity, the latter has to be sealed in order to prevent the ingress of moisture and contaminations which can lead to corrosion of the construction elements. It is often also desirable for the cavities and thus the construction element to be substantially reinforced but for the low weight to be maintained. It is often also necessary for the cavities and thus the construction elements to be stabilized in order for noises which would otherwise be transmitted along the cavity or through the latter to be reduced. Many of these cavities have an irregular shape or tight dimensions, on account of which it becomes difficult to properly seal, reinforce, and insulate said cavities.

Insulating elements (baffles) are therefore used in particular in the automotive industry but also in the aviation and nautical industry in order for cavities to be sealed and/or to be acoustically closed off, or reinforcing elements (reinforcers) are used in order for cavities to be reinforced.

A body of an automobile is schematically illustrated in FIG. 1a. The body 10 herein has various structures having cavities such as, for example, pillars 14 and supports or stays 12, respectively. Such structural elements 12, 14 having cavities are usually sealed or reinforced, respectively, using sealing and/or reinforcing elements 16.

A cross section through a structural element 12, 14 is schematically illustrated in FIG. 1b. As is often the case in such structural elements 12, 14, a first panel sheet 4 and a second panel sheet 5 are joined together at joints 6, 7, wherein the panel sheets 4, 5 configure a cavity 3 between the joints 6, 7.

Various approaches have already been taken in order for such structural elements 12, 14 having cavities 3 to be reinforced. It is furthermore desirable for reinforcing elements 16 that are as efficient as possible to be made available in order to be able to reinforce structural elements 12, 14 in the best possible way.

The invention is therefore based on the object of making available an improved reinforcing element for reinforcing structural elements in motor vehicles. Requirements such as arise in components having cases of particularly high loads are to be able to be better met in particular herein.

This object is achieved by a device for reinforcing a structural element in a motor vehicle, said device comprising: a reinforcing element which has a longitudinal axis and which is disposable in a cavity of the structural element, wherein the reinforcing element comprises side walls which extend substantially in the direction of the longitudinal axis; wherein a fastening element for the preliminary fixing of the reinforcing element to the structural element is disposed on a first side wall; wherein a side wall that is opposite the first side wall at a location that is opposite the fastening element has a closed surface for connecting to the structural element.

This solution has the advantage that devices for reinforcing a structural element which enable the reinforcing element to be better linked to the structural element can be made available on account thereof. Fundamentally more surface of the reinforcing element is available for linking to the structural element on account of the closed surface in relation to the fastening element.

It is a core concept of the present invention to provide a reinforcing element which on account of a larger linking face for adhesive bonding to the structural element enables an overall improved reinforcement of the structural element. It has been demonstrated herein that reinforcing elements which have comparatively large linking faces are better suited to meeting said requirements than reinforcing elements having comparatively small linking faces.

In one exemplary embodiment the first side wall and the fastening element are configured so as to be integral.

For example, the first side wall and the fastening element can be produced in the same operative step by an injection-moulding method, or by a three-dimensional printing method.

In one exemplary embodiment the fastening element is configured as a clip.

This has the advantage that a proven and standardized preliminary fixing of the reinforcing element to the structural element can be made available on account thereof.

In one exemplary embodiment the reinforcing element has one or two or three fastening elements, or more than three fastening elements.

A suitable number of fastening elements can be chosen so as to depend on requirements and conditions.

In one exemplary embodiment the fastening element is formed from the same material as the first side wall.

In one exemplary embodiment the side walls in a cross section that is perpendicular to the longitudinal axis and at the fastening element form a substantially closed surface for connecting to the structural element.

This has the advantage that a linking face for connecting the reinforcing element to the structural element can be optimized on account thereof.

In one exemplary embodiment the reinforcing element has a front wall and/or a rear wall which are/is disposed so as to be transverse to the longitudinal axis.

This has the advantage that, on account thereof, a linking face for connecting the reinforcing element to the structural element can be further enlarged in that the front wall and/or the rear wall are/is also utilizable as a linking face.

In one exemplary embodiment the reinforcing element comprises ribs which interconnect at least two side walls.

Such ribs offer the advantage that, on account thereof, a mechanical load-bearing capability of the reinforcing element per se can be improved.

In one exemplary embodiment the walls are formed from the same material.

In one exemplary embodiment the reinforcing element contains metal, steel, aluminium, magnesium, plastics material, fibre-reinforced plastics material, organic sheet material, or a combination of said materials.

The reinforcing element proposed here can be produced by a three-dimensional printing method, for example.

The object set at the outset is moreover achieved by a system of a reinforced structural element in a motor vehicle, the system comprising: a structural element; a reinforcing element according to the above description, wherein the reinforcing element is disposed in the structural element; and an adhesive, wherein the adhesive interconnects the reinforcing element and the structural element.

In one exemplary embodiment the adhesive has an expansion rate of less than 500%, or less than 400%, or less than 300%, or the adhesive is a non-expandable adhesive.

Materials which are expandable to a lesser degree, or non-expandable materials, offer the advantage that the adhesive, on account thereof, does not lose mechanical stability to an excessive degree during expansion. In principle, a material becomes weaker in mechanical terms the more the material is expanded.

SikaReinforcer®-940 or SikaPower®-497 in particular are examples of adhesives which are non-expandable or expandable to a lesser degree. SikaReinforcer®-940 herein is an example of an expandable material, whereas SikaPower®-497 is an example of a non-expandable material.

The term "non-expandable" in the context of this invention means that a material varies the volume thereof by not more than or less than 10% in the process steps envisaged for said material. For example, non-expandable adhesives can shrink to a minor degree when curing. Such a volumetric variation when curing is considered to be "non-expandable" in the context of this application.

In one exemplary embodiment the adhesive is capable of being cured by a temperature of more than 120° or more than 140° or more than 160°.

In one further alternative embodiment the system comprises a first adhesive and a second adhesive, wherein the adhesives have dissimilar properties, in particular in terms of expansion and/or curing and/or a mating capability and/or mechanical loading.

In one exemplary embodiment, the adhesive is a tape adhesive, a shape memory adhesive, an injectable adhesive, an injection-moulded adhesive or an extruded adhesive.

In one exemplary embodiment the adhesive connects at least the first side wall and the opposite side wall to the structural element.

In one exemplary embodiment the adhesive moreover connects the second and/or the third side wall to the structural element.

In one exemplary embodiment the adhesive in a region of a first joint and/or in a region of a second joint of the structural element forms a continuous layer such that the reinforcing element in this region is connected to both a first panel sheet as well as to a second panel sheet.

This is of advantage because an improvement in the reinforcement of the entire system is achievable on account of a reinforcement of the structural element in the regions of the joints by way of the reinforcing element.

In one exemplary embodiment the adhesive is heat-curable and after curing has an E-modulus of at least 100 MPa or at least 150 MPa or at least 200 MPa.

Details and advantages of the invention will be described hereunder by means of exemplary embodiments and with reference to schematic drawings.

In the drawings:

FIGS. 2a and 2b show a schematic illustration of a device according to the prior art;

FIGS. 3 and 4 show a schematic illustration of a device according to the prior art;

Figure 1A:
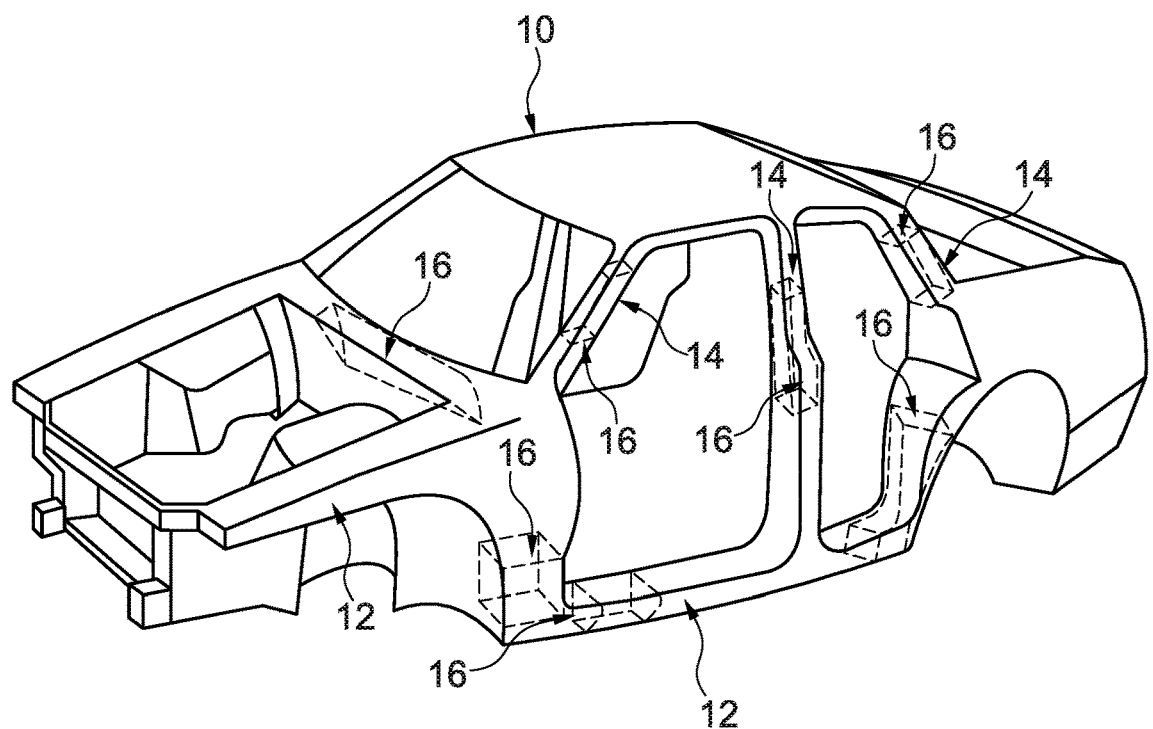
FIG. 1a shows a schematic illustration of a body.
Figure 1B:
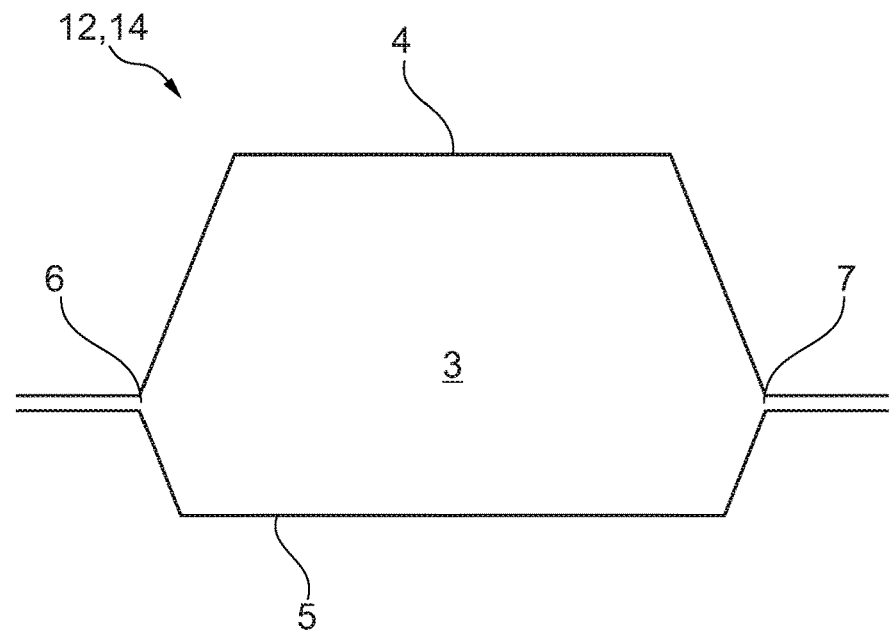
FIG. 1b shows a schematic illustration of a cross section through a structural element.

An already known device 16 for reinforcing structural elements 12, 14 is illustrated in FIGS. 2a and 2b. The device 16 comprises a reinforcing element 20 and an adhesive 13 disposed thereon. The device 16 moreover has two fastening elements 28 for the preliminary fixing of the device 16 in the structural element 12, 14.

The reinforcing element 20 on that side wall that is in each case opposite the fastening elements 28 has an opening 18. Such openings 18 are commonplace because the reinforcing element 20 on account thereof can be produced by an injection-moulding method, because the de-moulding from the injection mould is guaranteed by the opening 18. However, in such known devices 16 it is disadvantageous that there is no linking face for connecting the reinforcing element 20 to the structural element 12, 14 is available in the region of the openings 18.

Various cross sections through a system 1 of a reinforced structural element 12, 14 are illustrated in FIGS. 3a to 4b. One reinforcing element 20 herein is in each case disposed in the cavity 3 of the structural element 12, 14. The reinforcing element 20 herein is connected to the structural element 12, 14 by way of an adhesive 13.

Further devices 16 according to the prior art are illustrated in FIGS. 3 and 4, in this instance in each case in the cross section. The reinforcing elements 20 herein have in each case one opening 18 on a side wall that is opposite the side wall having the fastening element 28.

The reinforcing element 20 in FIG. 3 has a C-shaped cross section, and the reinforcing element 20 in FIG. 4 has a W-shaped or M-shaped cross section, respectively.

The adhesive 13 in the examples according to FIGS. 2a and 2b as well as 3 and 4 is in each case configured as an expandable adhesive which is disposed on the reinforcing element 20 (for example by way of bi-component injection moulding).

Four different exemplary embodiments are now schematically illustrated in FIGS. 5a to 5d, in which exemplary embodiments one side wall 25 that is opposite the first side wall 21 at least one location 38 that is opposite the fastening element 28 has a closed surface for connecting to the structural element.

Figure 5A:
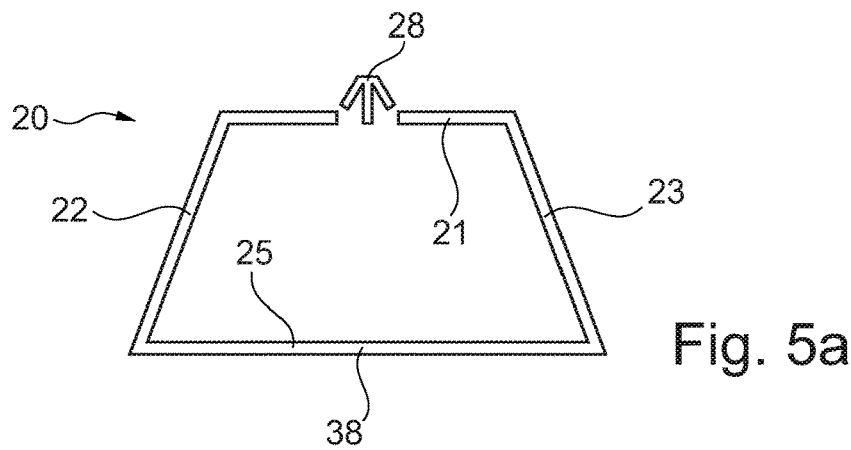
FIGS. 5a to 5d show a schematic illustration of exemplary reinforcing elements in the cross section.

The reinforcing element 20 in FIG. 5a has a quadrangular cross section.

Figure 5B:
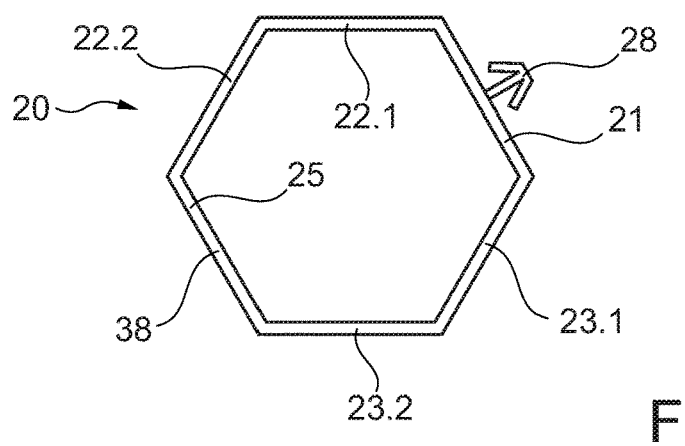

The reinforcing element 20 in FIG. 5b has a hexagonal cross section, wherein the second side wall 22 and the third side wall 23 are in each case subdivided into part-walls 22.1, 22.2, 23.1, 23.2.

Figure 5C:
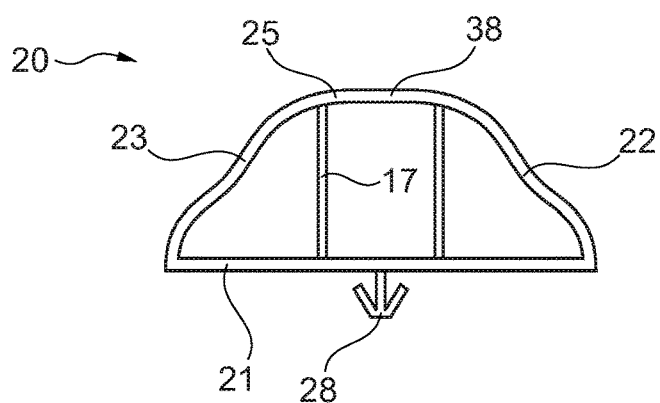
Figure 5D:
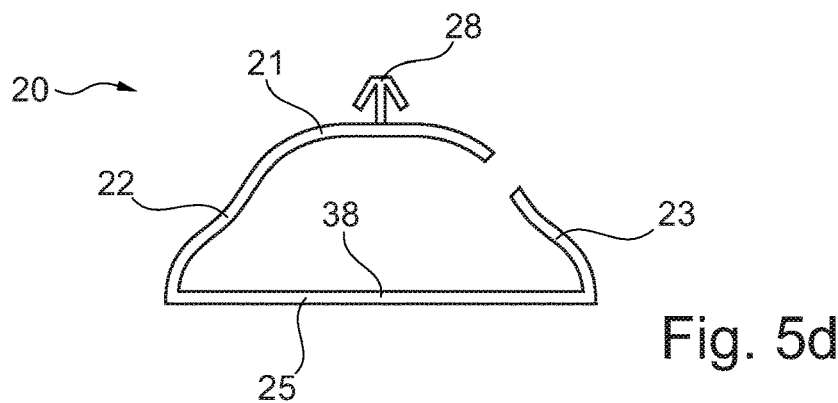

The reinforcing element 20 in FIG. 5c has an irregularly shaped cross section. The first side wall 21 herein is configured so as to be planar, and the remaining side walls 22, 23, 25 are configured so as to be undulated. The reinforcing element 20 in this exemplary embodiment has ribs 17 in an interior.

The reinforcing element 20 in FIG. 5d again has an irregularly shaped cross section. The side wall 25 that is opposite the first side wall 21 herein is configured so as to be planar, and the remaining side walls 21, 22, 23 are configured so as to be undulated. In this exemplary embodiment the third side wall 23 has an opening such that the cross section of the reinforcing element 20 is not completely closed.

Figure 6A:
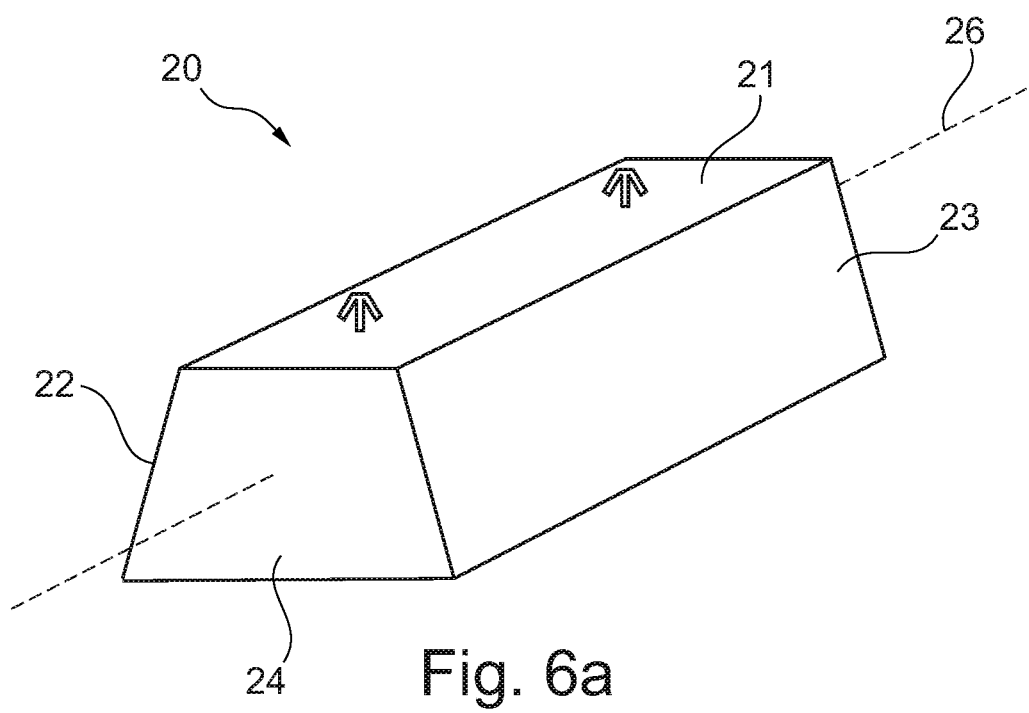
FIGS. 6a and 6b show a schematic illustration of an exemplary reinforcing element in a spatial view.
Figure 6B:
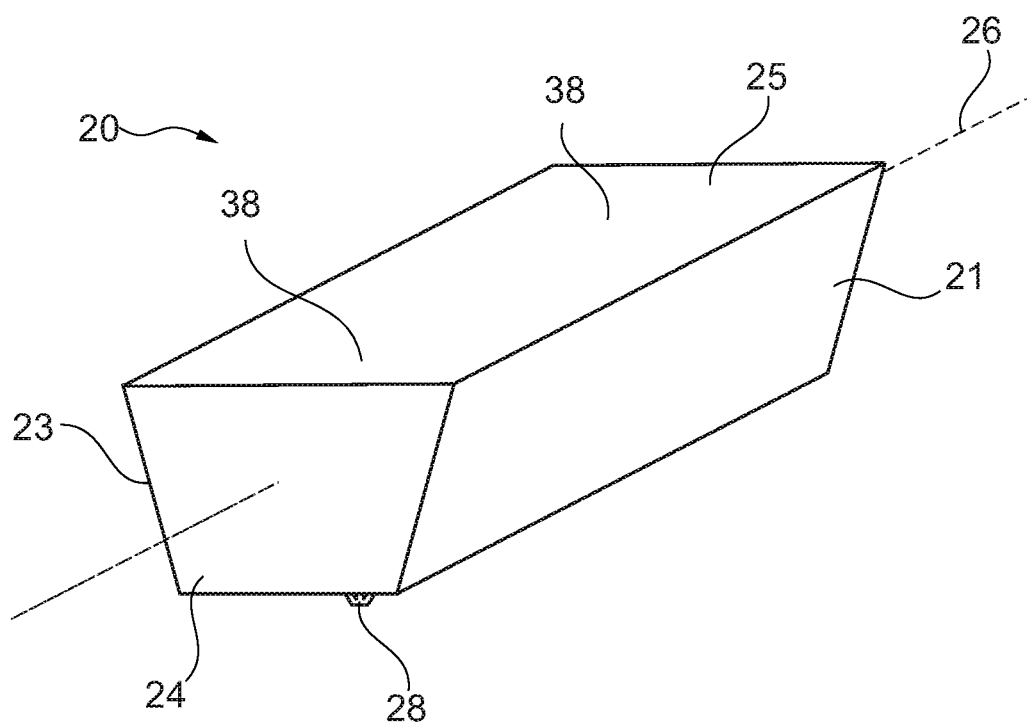

A further exemplary embodiment of a reinforcing element 20 is schematically shown in a spatial illustration in FIGS. 6a and 6b. The reinforcing element 20 in this example has two fastening elements 28 which both are disposed on the first side 21. The side wall 25 that is opposite the first side wall 21 herein has a closed surface at the locations 38 that are opposite the fastening elements 28. A larger linking face for connecting the reinforcing element 20 to the structural element 12, 14 is thus available.

The side walls 21, 22, 23, 25 are disposed along a longitudinal axis 26 of the reinforcing element 20.

The reinforcing element 20 in this exemplary embodiment has a quadrangular cross section.

LIST OF REFERENCE SIGNS

1 System
3 Cavity
4 First panel sheet
5 Second panel sheet
6 First joint
7 Second joint
10 Body
11 Reinforcing element
12 Structural element
13 Adhesive
14 Structural element
16 Device
17 Rib
18 Opening
20 Reinforcing element
21 First side wall
22 Second side wall
23 Third side wall
24 Front/rear wall
25 Opposite side wall
26 Longitudinal axis
28 Fastening element
38 Location opposite the fastening element

The invention claimed is:

1. A device for reinforcing a structural element in a motor vehicle, the device comprising:
a reinforcing element which has a longitudinal axis and which is disposable in a cavity of the structural element, wherein the reinforcing element comprises (i) a plurality of side walls which extend and are elongate substantially in the direction of the longitudinal axis, (ii) ribs which interconnect at least two of the side walls; (iii) a front wall and/or a rear wall which are/is disposed in a plane that is transverse to the longitudinal direction; and (iv) a fastening element for preliminarily fixing the reinforcing element to the structural element;
wherein: (i) the fastening element is disposed on a first side wall of the plurality of side walls; and
(ii) an opposite side wall of the plurality of side walls that is opposite the first side wall has a closed surface at a location that is opposite the fastening element, the closed surface being configured to connect to the structural element.

2. The device according to claim 1, wherein the first side wall and the fastening element are configured so as to be integral.

3. The device according to claim 1, wherein the fastening element is configured as a clip.

4. The device according to claim 1, wherein the reinforcing element has one or two or three fastening elements.

5. The device according to claim 1, wherein the fastening element is formed from the same material as the first side wall.

6. The device according to claim 1, wherein the side walls in a cross section that is perpendicular to the longitudinal axis and at the fastening element form a substantially closed surface for connecting to the structural element.

7. The device according to claim 1, wherein the side walls are formed from the same material.

8. The device according to claim 1, wherein the reinforcing element contains metal, steel, aluminium, magnesium, plastics material, fibre-reinforced plastics material, organic sheet material, or a combination of the materials.

9. A system of a reinforced structural element in a motor vehicle, the system comprising:
the structural element;
the reinforcing element according to claim 1, wherein the reinforcing element is disposed in the structural element; and
an adhesive, wherein the adhesive interconnects the reinforcing element and the structural element.

10. The system according to claim 9, wherein the adhesive is a non-expandable adhesive.

11. The system according to claim 9, wherein the adhesive is an expandable adhesive.

12. The system according to claim 11, wherein the adhesive has an expansion rate of less than 500%.

13. The system according to claim 9, wherein the adhesive is heat-curable, and wherein the adhesive after curing has an E-modulus of at least 100 MPa.

14. The device according to claim 1, wherein the ribs interconnect the first side wall to the opposite side wall.

15. The device according to claim 1, wherein the closed surface is configured to provide a linking face for bonding to the structural element with adhesive.

16. The system according to claim 9, wherein the adhesive is provided at an interface between the closed surface of the opposite side wall and the structural element to interconnect the reinforcing element to the structural element.

* * * * *